United States Patent
Du et al.

(10) Patent No.: US 9,670,417 B2
(45) Date of Patent: Jun. 6, 2017

(54) FLUID BED COKING PROCESS WITH DECOUPLED COKING ZONE AND STRIPPING ZONE

(71) Applicants: Bing Du, Fairfax, VA (US); Timothy M. Healy, Centreville, VA (US); Fritz A. Bernatz, League City, TX (US); Yi En Huang, North Potomac, MD (US); Zachary R. Martin, Fairfax, VA (US); Brenda A. Raich, Annandale, NJ (US)

(72) Inventors: Bing Du, Fairfax, VA (US); Timothy M. Healy, Centreville, VA (US); Fritz A. Bernatz, League City, TX (US); Yi En Huang, North Potomac, MD (US); Zachary R. Martin, Fairfax, VA (US); Brenda A. Raich, Annandale, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 425 days.

(21) Appl. No.: 14/185,243

(22) Filed: Feb. 20, 2014

(65) Prior Publication Data

US 2014/0251783 A1    Sep. 11, 2014

Related U.S. Application Data

(60) Provisional application No. 61/775,009, filed on Mar. 8, 2013.

(51) Int. Cl.
*B01J 8/00* (2006.01)
*C10G 9/32* (2006.01)
(Continued)

(52) U.S. Cl.
CPC ............. *C10G 9/32* (2013.01); *B01J 8/1809* (2013.01); *B01J 8/34* (2013.01); *B01J 8/388* (2013.01);
(Continued)

(58) Field of Classification Search
USPC ........ 202/105; 422/145, 146, 609, 611, 620; 208/50
See application file for complete search history.

(56) References Cited

U.S. PATENT DOCUMENTS 3,261,775 A    7/1966    Blaser
3,726,791 A    4/1973    Kimberlin, Jr. et al.
(Continued)

FOREIGN PATENT DOCUMENTS

GB            760194 A    10/1956

OTHER PUBLICATIONS

PCT Application No. 2014/017533, Communication from the International Searching Authority, International Search Report, Form PCT/ISA/210, dated Apr. 30, 2014, 5 pages.
PCT Application No. 2014/017533, Communication from the International Searching Authority, Written Opinion, Form PCT/ISA/237, dated Apr. 30, 2014, 7 pages.

*Primary Examiner* — Nina Bhat
(74) *Attorney, Agent, or Firm* — Chad A. Guice

(57) ABSTRACT

A fluid coking unit for converting a heavy oil feed to lower boiling products by thermal has a centrally-apertured annular baffle at the top of the stripping zone below the coking zone to inhibit recirculation of solid particles from the stripping zone to the coking zone. By inhibiting recirculation of the particles from the stripping zone to the coking zone, the temperatures of the two zones are effectively decoupled, enabling the coking zone to be run at a lower temperature than the stripping zone to increase the yield of liquid products.

15 Claims, 4 Drawing Sheets

(51) Int. Cl.
*B01J 8/18* (2006.01)
*B01J 8/34* (2006.01)
*B01J 8/38* (2006.01)
*C10G 9/00* (2006.01)
*C10G 9/30* (2006.01)

(52) U.S. Cl.
CPC ............... *C10G 9/005* (2013.01); *C10G 9/30* (2013.01); *B01J 2208/0053* (2013.01); *B01J 2208/0084* (2013.01); *B01J 2208/00938* (2013.01); *C10G 2300/4006* (2013.01); *C10G 2300/4081* (2013.01); *C10G 2300/4093* (2013.01)

(56) References Cited

U.S. PATENT DOCUMENTS

| | | |
|---|---|---|
| 3,752,658 A | 8/1973 | Dover |
| 4,203,759 A | 5/1980 | Metrailer et al. |
| 4,213,848 A | 7/1980 | Saxton |
| 4,269,696 A | 5/1981 | Metrailer |
| 4,295,956 A | 10/1981 | Metrailer |
| 4,378,288 A | 3/1983 | Shih et al. |
| 4,587,010 A | 5/1986 | Blaser et al. |
| 5,176,819 A | 1/1993 | Green |
| 5,876,819 A | 3/1999 | Kimura et al. |
| 2011/0114468 A1 | 5/2011 | Davuluri et al. |
| 2011/0206563 A1 | 8/2011 | Wyatt et al. |

FLUID BED COKING PROCESS WITH DECOUPLED COKING ZONE AND STRIPPING ZONE

CROSS REFERENCE TO RELATED APPLICATIONS

This application is based on and claims priority under 35 USC 120 from U.S. Provisional Application No. 61/775,009, filed 8 Mar. 2013.

FIELD OF THE INVENTION

The present invention relates to a fluid coking process and more particularly to a fluid coking process in which the coking zone can be run at a lower temperature than the stripping zone.

BACKGROUND OF THE INVENTION

Much work has been done over the years to convert heavy hydrocarbonaceous materials to more valuable lighter boiling products by various thermal processes including visbreaking, delayed coking and fluid coking.

In fluid coking, a heavy oil chargestock, such as a vacuum residuum, is fed to a coking zone containing a fluidized bed of hot solid particles, usually coke particles, sometimes referred to as seed coke. The heavy oil undergoes thermal cracking at the high temperatures in the coking zone resulting in conversion products which include a cracked vapor fraction and coke. The coke is deposited on the surface of the seed coke particles and a portion of the coked-seed particles is sent from the coking zone to a heating zone which is maintained at a temperature higher than that of the coking zone. Some of the coke is burned off in the heating zone and hot seed particles from the heating zone are returned to the coking zone as regenerated seed particles, serving as the primary heat source for the coking zone. In the variant of the fluid coking process developed by Exxon Research and Engineering known as Flexicoking™, a portion of hot coke from the heating zone is circulated back and forth to a gasification zone which is maintained at a temperature greater than that of the heating zone. In the gasifier, substantially all of the remaining coke on the coked seed particles is burned, or gasified, in the presence of oxygen (air) and steam to generate low heating value fuel gas which can be partly passed to the burner/heater to increase temperature in that zone and/or used as refinery fuel. Fluid coking processes, with or without an integrated gasification zone, are described, for instance in U.S. Pat. Nos. 3,726,791; 4,203,759; 4,213,848; and 4,269,696.

Modifications have been made over the years in an attempt to achieve higher liquid yields. For example, U.S. Pat. No. 4,378,288 discloses a method for increasing coker distillate yield in a coking process by adding small amounts of a free radical inhibitor. Notwithstanding these improvements, however, there remains a need for process and equipment modifications which can increase liquid yields and in fluid coking, a reduction of the temperature in the coking zone is the most effective solution. While there are economic incentives to increase the feed capacity, reducing the temperature of the coking zone and increasing unit capacity will tend to increase the amounts of liquid hydrocarbon passing from the coking zone to the stripping zone with consequent increase in the fouling in the stripping zone. Various techniques for alleviating the fouling problem have been proposed: US 2011/114468, for example, describes the use of perforated sheds in the stripping zone while U.S. 2011/0206563 describes the use of downwardly slopping frusto-conical baffles in the coking zone to the same end. Nevertheless, the objective of increasing the yield of the desired liquid products remains with the desirability of reducing reactor temperature even in the face of the fouling problem which is created by reductions in reactor temperature.

By increasing the temperature of the stripping zone the liquid yield may be increased by enabling the temperature of the coking zone to be reduced. U.S. Pat. No. 5,176,819 describes a process to run the stripping zone at a higher temperature than the coking zone by feeding a portion of the heated solids from the burner/heater (and gasifier if applicable) to the stripping zone. Significant liquid yield increases of 1% are reported while the increased temperature of the stripping zone also tends to reduce the amount of hydrocarbon carryunder out of the stripping zone. We have now found that the flow in the fluid bed coking unit, especially in the coking zone, is dominated by large scale recirculation patterns that are much faster (~50×) than the external circulation rate between the coking zone and the burner/heater/gasifier. This suggests that the hot solids from burner/heater/gasifier fed to the stripping zone in the manner described in U.S. Pat. No. 5,876,819 could be recirculating in both the stripping zone and the coking zone: the hot coke fed to the top of the stripper becomes distributed in both the coking zone and the stripping zone and the mass fraction of the hot coke in the coking zone and in the stripping zone is similar. This indicates that the coking zone and the stripping zone are not effectively decoupled and that the coking zone is not being operated at the desired relatively lower temperature with a consequent loss in liquid yield and, conversely, that the stripping zone is not being operated at the higher temperature appropriate to reduce fouling.

SUMMARY OF THE INVENTION

We have now found that the stripping zone and the coking zone may be more effectively decoupled by means of an annular baffle at the top of the stripping zone. With the annular baffle, the recirculation between the coking zone and the stripping zone is reduced and hot coke solids fed to the stripping zone are confined in the stripping zone. The operating temperatures in the coking zone and the stripping zone can then be controlled separately by adjusting the coke circulation rates to the coking zone and the stripping zone. This allows the coking zone to be run at a lower temperature, which can increase either the liquid yields or the capacity of the coking process. In accordance with the present invention, therefore, the fluid coking unit for converting a heavy oil feed to lower boiling products by thermal cracking under coking conditions in a fluid bed, comprises: (i) a coking zone to contain a fluidized bed of hot solid particles into which the heavy oil feed is introduced to convert feed to lower boiling products in the form of vaporous cracking products with deposition of coke on the solid particles in the coking zone; (ii) a scrubbing zone into which the vaporous products from the coking zone are passed; (iii) a stripping zone, at the bottom of the coking zone, for stripping hydrocarbons which adhere to the solid particles passing into the stripping zone from the coking zone; (iv) a heater communicating with the stripping zone to receive solid particles from the stripping zone; (v) a return conduit for passing hot solid particles from the heater to the coking zone; (vi) a recycle conduit for recycling hot solid particles from the heater to the stripping zone; and (vii) a centrally-apertured annular baffle at the top of the stripping zone to inhibit recirculation of solid particles from the stripping zone to the coking zone.

The unit may optionally include a gasifier which is connected by a transfer conduit to the heater to receive a portion of the fluidized solid particles from the heater; in the gasifier, the coke on the particles is converted by reaction with steam and oxygen (typically supplied as air) in an oxygen-limited atmosphere at a temperature higher than that of the heater, suitably from 870 to 1100° C., to a fuel gas at least a part of which can be fed to the heater to support the temperatures required in the heater, the rest being used as fuel gas elsewhere. A slipstream of hot solid particles from the gasifier may be recycled to the coking zone and/or the stripping zone depending on the temperature requirements in the respective zones.

The process for running the unit essentially comprises the following operations: (i) introducing a heavy oil feed into a coking zone containing a fluidized bed of solid particles and subjecting the feed to thermal coking conditions in the coking zone in the presence of the solid particles to produce hydrocarbon vapors and coke which is deposited on the solid particles with hydrocarbons adhering to the particles; (ii) passing solid particles from the coking zone to the stripping zone through a central aperture in the baffle at the top of the stripping zone and stripping at hydrocarbons which adhere to the solid particles passing into the stripping zone while inhibiting recirculation of solid particles from the stripping zone to the coking zone; (iii) passing solid particles from the stripping zone to the heater where the coke on the particles is combusted in a fluidized at a temperature greater than that of the coking zone to generate heat; (iv) recycling a portion of heated solids from the heating zone to the coking zone; and (v) recovering the hydrocarbon vapors from the coking zone.

With the use of the annular baffle at the top of the stripping zone to reduce the extent of recirculation from the stripping zone, the coking zone will operated at a lower temperature than the stripping zone.

DRAWINGS

In the accompanying drawings:

FIG. 1 is a simplified schematic of a fluid coking unit of the type described in U.S. Pat. No. 5,176,819;

DETAILED DESCRIPTION

Any heavy hydrocarbonaceous oil which is typically fed to a coking process can be used in the present fluid cokers. Generally, the heavy oil will have a Conradson Carbon Residue (ASTM D189-06e2) of about 5 to 40 wt. % and be comprised of fractions, the majority of which boil above about 500° C. and more usually above 540° C. or even higher, e.g. 590° C. Suitable heavy oils include heavy petroleum crudes, reduced petroleum crudes, petroleum atmospheric distillation bottoms, petroleum vacuum distillation bottoms, pitch, asphalt, bitumen, liquid products derived from coal liquefaction processes, including coal liquefaction bottoms, and mixtures of these materials.

A typical petroleum chargestock suitable for coking in a fluid coking unit will have, for example, a composition and properties within the following ranges:

| Conradson Carbon | 5 to 40 wt. % |
|---|---|
| Sulfur | 1.5 to 8 wt. % |
| Hydrogen | 9 to 11 wt. % |
| Nitrogen | 0.2 to 2 wt. % |
| Carbon | 80 to 86 wt. % |
| Metals | 1 to 2000 wppm |
| Boiling Point | 340° C.+-650° C.+ |
| API Gravity | −10 to 35° |

Figure 1:
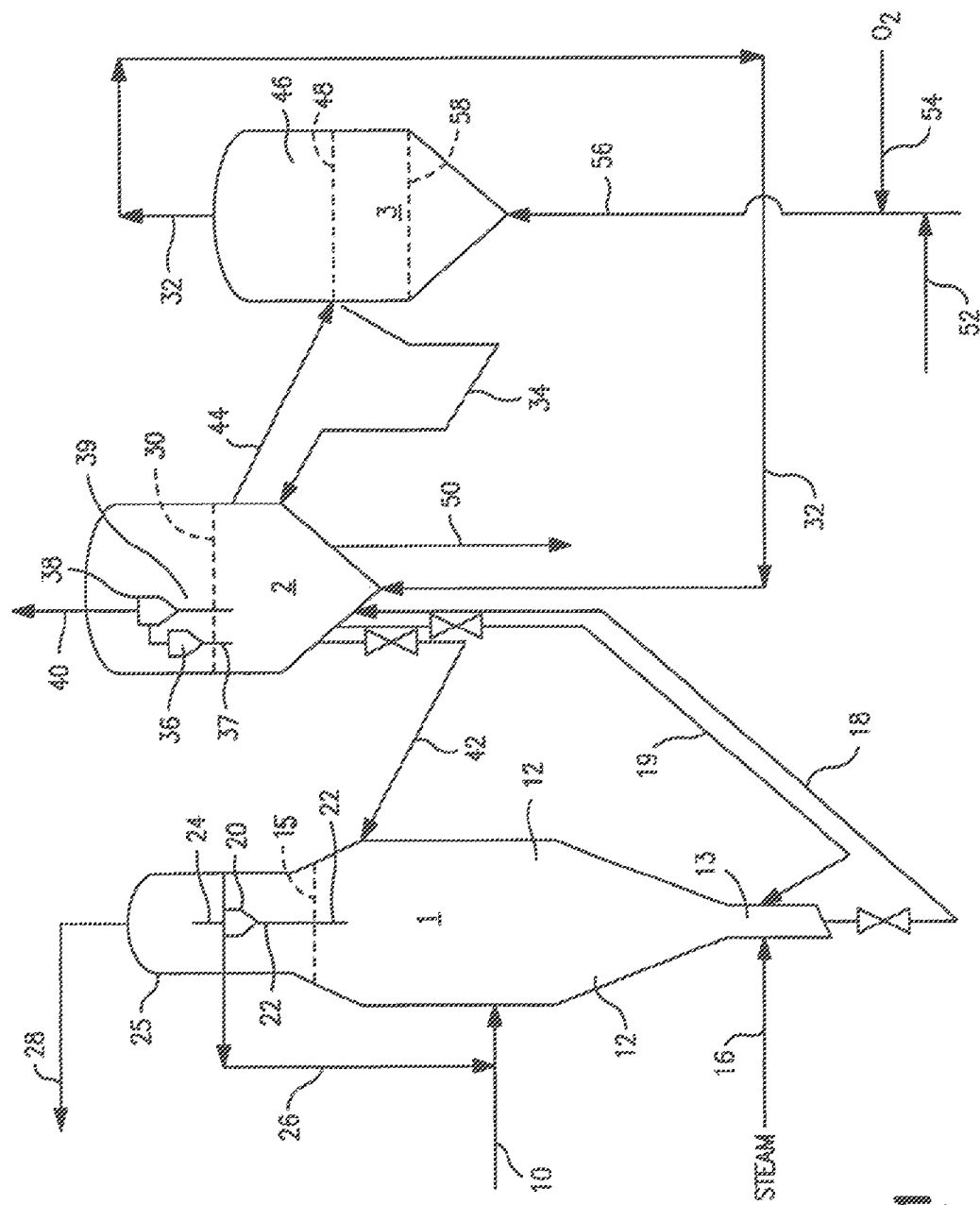

FIG. 1 shows an integrated coking/gasification unit where most of the coke is gasified with a mixture of steam and air in a gasification zone, as shown in U.S. Pat. No. 5,176,819. A heavy oil feed stream is passed via line 10 to the reaction or coking zone 12 of coker reactor 1, which contains a fluidized bed of hot seed particles having an upper level indicated at 15. Although the seed material will normally be coke particles, they may also be other refractory materials selected from the group consisting of silica, alumina, zirconia, magnesia, alumina or mullite. They may also be synthetically prepared, or naturally occurring materials, such as pumice, clay, kieselguhr, diatomaceous earth, bauxite. The seed particles preferably have an average particle size of about 40 to 1000 microns, preferably from about 40 to 400 microns.

The lower portion of the coking reactor constituting stripping zone 13 has the purpose of removing occluded hydrocarbons from the coke. A fluidizing gas e.g. steam, is admitted at the base of coker reactor 1, through line 16, into stripping zone 13 of the reactor to produce a superficial fluidizing gas velocity in the seed particles. The velocity is typically in the range from 0.15 to 1.5 m/sec. A major portion of the feed, undergoes thermal cracking reactions in the reactor in the presence of the hot seed particles to form cracked hydrocarbon vapors and a fresh coke layer containing occluded hydrocarbons on the fluidized seed particles. Vaporous conversion (cracking) products pass through reactor cyclone 20 to remove entrained solids which are returned to the coking zone through cyclone dipleg 22. The vapors leave the cyclone through line 24, and pass into a scrubbing zone 25 mounted on the top of the coking reactor. A stream of heavy materials condensed in the scrubbing zone may be recycled to the coking reactor via line 26. The coker conversion products are removed from the scrubber 25 via line 28 for fractionation and product recovery in the conventional manner.

The coke is partially stripped of occluded hydrocarbons in the stripping zone 13 by use of the steam and carried via line 18 to the heating zone 2, also referred to here as the burner or heater where it is introduced into the fluidized bed of hot seed/coke particles in the heater up to an upper level indicated at 30. In the heater, combustion of the coked particles takes place to generate heat required for the endothermic cracking reactions taking place in the reactor. The portion of the hot coke that is not burned in order to provide the heat requirements of the coking zone is recycled from heater 2 to coking zone 12 through recirculation conduit 42 to supply the heat required to support the endothermic cracking reactions. The heater is maintained at a temperature above the temperature maintained in the coking zone, for example, at a temperature from 40 to 200° C., preferably from 65 to 175° C., and more preferably 65 to 125° C. in excess of the operating temperature of the coking zone. The heated solids are sent to the coking zone in an amount sufficient to maintain the coking temperature in the range of 450 to 650° C. The pressure in the coking zone is typically maintained in the range of 0 to 10 barg, preferably in the range of 0.3 to 3 barg.

A portion of the hot seed/coke from the heating zone is passed via line 19 to the top of the stripping zone 13. This allows the temperature of the stripping zone to be controlled independently of the temperature of the coking zone so as to raise the temperature of the stripping zone above the temperature of the coking zone to achieve higher liquid yields. In the past, higher temperatures than needed for maximum liquid yields had been maintained in the coking zone to prevent defluidization of the seed particles in that zone as well as in the stripping zone which is more susceptible to defluidization. Besides improving fluidization in the stripping zone, the increase in the stripping zone temperature also improves stripping of the occluded hydrocarbons to increase liquid yield and reduces fouling although the increase in the temperature of the stripping zone has, in the past, resulted in increases in the temperature of the reaction or coking zone which tend to reduce liquid yield as a result of overcracking. The interposition of the annular baffle above the stripping zone, however, reduces the recirculation of hot coke from the heater into the reaction zone via the stripping zone, thus decoupling the stripping zone from the reaction zone. If desired, a portion of hot seed/coke particles can also be passed from the gasifier to the top of the stripping zone in addition to, or instead of, the particles from the heater.

The gaseous effluent of the heater, including entrained solids, passes through a cyclone system comprising a primary cyclone 36 and a secondary cyclone 38 in which the separation of the larger entrained solids occur. The separated larger solids are returned to the heater bed via the respective cyclone diplegs 37 and 39. The heated gaseous effluent which contains entrained solids is removed from the heater via line 40.

The portion of the stripped coke that is not burned in order to satisfy the heat requirements of the coking zone is recycled from the heater to the coking zone through recirculation conduit 42 to supply heat to support the endothermic cracking reactions. Normally, the recycled coke passes out of a return line from the heater to enter the reactor near the top of the coking zone, as shown in US 2011/0206563, with an inverted cap over the top of the return line to direct the recycled coke particles downwards into the coking zone. The cap on the top of the coke return line conveniently comprises an annular ring supported over the open top of the return line with a flat circular cap plate axially centered over the line and the annular ring, supported by a spider structure supporting the annular ring. A preferred variation allows a smaller flow of hot coke from the heater to be admitted from a second return line higher up in reactor 1 at a point in the dilute phase where it is entrained into the cyclone inlet(s) as scouring coke to minimize coking of the reactor cyclones and the associated increase in the pressure drop. Reference is made to US 2011/0206563 for a description of these options.

Another portion of coke is removed from heater 2 and passed by line 44 to the gasification zone 46 in gasifier 3 in which is maintained a bed of fluidized coke particles having a level indicated at 48 where the hot coke is converted to a fuel gas by partial combustion in the presence of steam in an oxygen-deficient atmosphere. Any remaining portion of excess coke may be removed from heater 2 by line 50 as fluid coke by-product. The temperature in the fluidized bed in heater 2 is partly maintained by passing fuel gas from gasifier 3 into the heater by way of line 32. Supplementary heat may be supplied to the heater by hot coke recirculating from the gasifier 3 through return conduit 34.

The gasification zone is suitably maintained at a temperature ranging from about 870° to 1100° C. and at a pressure ranging from about 0 to 10 barg, preferably at a pressure ranging from about 1.5 to about 3 barg. Steam by line 52, and a molecular oxygen-containing gas, such as air, commercial oxygen, or air enriched with oxygen by line 54, pass via line 56 into gasifier 3. The reaction of the coke particles in the gasification zone with the steam and the oxygen-containing gas produces a hydrogen and carbon monoxide-containing fuel gas of low heating value, typically from 3 to 7 MJ/kg. The product gas from the gasifier, which may further contain some entrained solids, is removed overhead from gasifier 3 by line 32 and introduced into heater 2 to provide a portion of the required heat as previously described or sent to the refinery fuel gas system for use elsewhere.

Figure 2A:
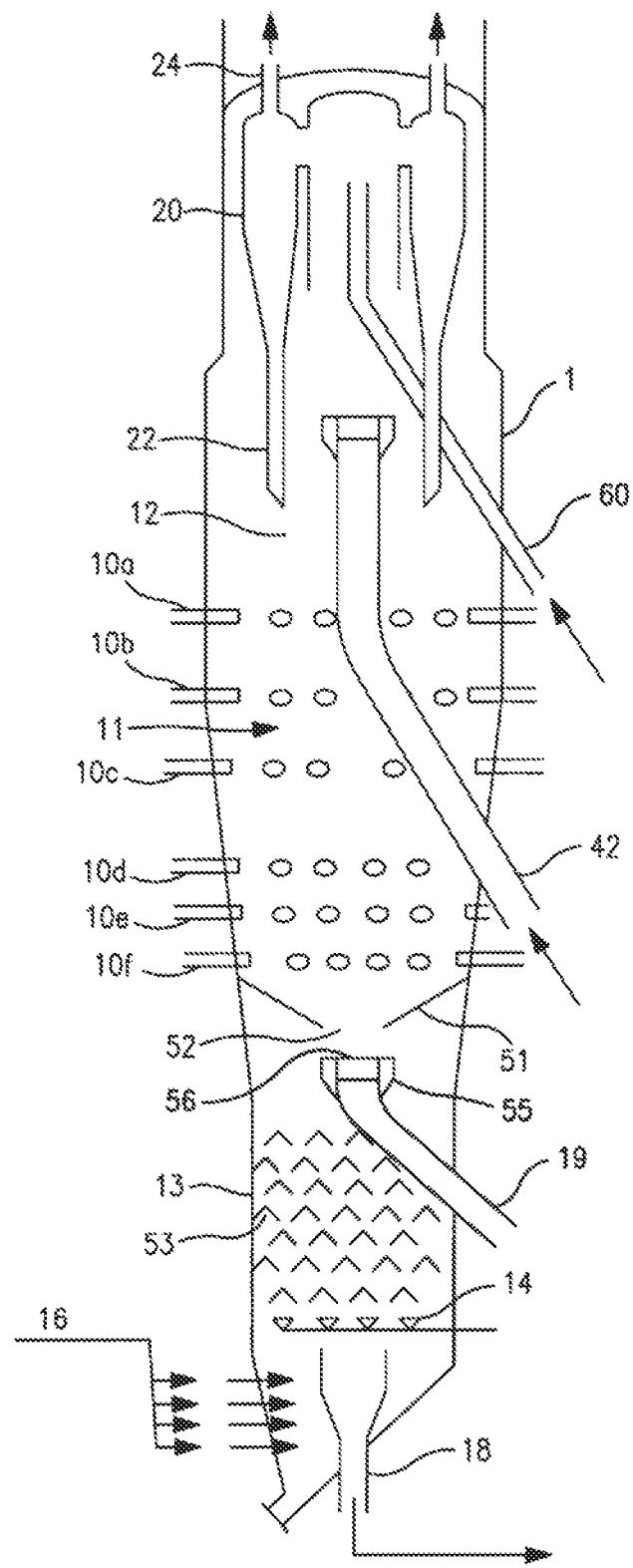
FIG. 2A is a simplified section of the reactor section of a fluid coking unit with recycle of hot coke from the heater to the stripping zone and an annular baffle to inhibit recirculation of coke from the stripping zone into the reactor.
Figure 2B:
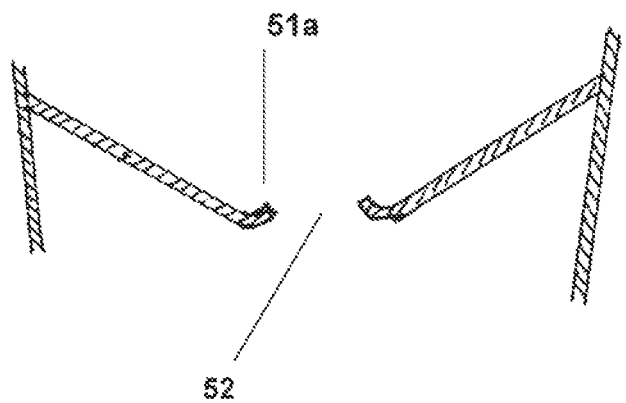
FIG. 2B is an enlarged portion of FIG. 2A in the region of the baffle, showing the configuration including the optional, upturned lip at the circumference of the aperture.

FIG. 2A, which uses the same references are FIG. 1 where applicable, shows the form of the annular baffle 51 at the top of stripping zone 13. Briefly, it comprises the frustum of a downwardly pointed cone with a central aperture 52 to allow the seed/coke particles to pass from the coking zone 12 into stripping zone 13. The frusto-conical baffle is fixed at its upper, outer circumference to the inner wall of the reactor and may have an upturned lip around the circumference of the aperture as shown in FIG. 2B to direct the downward flowing solids more to the center of the bed and it so provide a longer residence time for the downward flowing solids before reaching the stripper. This will have the effect of reducing the fouling in the stripper and, in the case of the Flexicoker, reducing the fouling in the heater overhead with fewer hydrocarbons carried over into the heater.

The configuration of the baffle, together with the downward flux of particles from the coking zone through the aperture, inhibits or precludes recirculation of the particles from the stripping zone back into the coking zone so that the particles in the stripping zone are effectively confined in that zone. In this way, temperatures of the stripping zone and the coking zone are more effectively decoupled making it feasible to maintain a relatively lower temperature in the coking zone to improve the yield of liquid cracking products and/or increase the capacity of the unit. Typically, the annular baffle will have open area from 30 to 70% of its total area (as seen on a horizontal (plan) projection), normally between 40 to 60%, with about 50% being generally useful. The angle is typically from 30 to 60°, most usually about 45° from the vertical.

FIG. 2A has multiple feed injection nozzles 10a, 10b, 10c, 10d, 10e, 10f located at vertically spaced levels in the reactor with the nozzles arranged in rings around the circumference of the coking zone to inject the feed inwardly into the coking zone The hot coke return line from heater 2 (not shown in FIG. 2A) is made through line 42 which introduces the hot coke near the top of coking zone 12 allowing the hot coke to descend in the body of the coking zone, contacting the heavy oil feed injected through the successive rings of injection nozzles 10a . . . 10f, as it falls through the ascending cracked vapors and injected oil streams in the coking zone before passing through central aperture 52 in downwardly directed frusto-conical baffle 51 into stripping zone 13. As described above for FIG. 1, the cracked vapors leave the coking zone by way of cyclones 20 to pass into the scrubbing zone above the reactor. Hot scouring coke may also be introduced from heater 2 at a higher level into the coking zone through line 60 in the region of the cyclone vapor inlet in order to minimize the pressure drop associated increase with coking in the reactor cyclones.

Introduction of the recycled hot coke from line 19 through the side of the stripper as shown is feasible. and is preferred for mechanical simplicity although it relies on the staging baffle to facilitate the distribution of the hot coke into the coke entering the stripper from the coking zone to increase increasing its temperature. Alternative mechanical configurations are, however, conceivable, as site and unit locations permit, for example, with the recycled hot coke entering the stripping zone from the heater by way of a vertical conduit extending upwards along the central axis of the stripper. Tangential injection of the recycled hot coke, although promoting vigorous mixing with the coke from the reaction zone is not generally favored in view of its effect on downward flow in the stripper.

Stripping zone 13 has steam spargers 14 arranged below stripper sheds 53 which are preferably in the form of apertured sheds as shown in U.S. Patent Publication No. 2011/0114468 to which reference is made for details of these sheds. The aperture sheds improve stripping of the occluded hydrocarbons and reduce shed fouling (formation of "shark fins") in the stripping zone. Disposition of the sheds in the cross hatch arrangement with sheds in successive tiers rotated angularly from one another in the horizontal plane, usually at 90°, as described in U.S. 2011/0114468. The hot coke from heater 2 which enters the stripping zone through conduit 19 has its outlet 55 located at the top of stripping zone 13 above the stripper sheds on the central vertical axis off the stripping zone which itself coincides with the central vertical axis of the reactor. Although the flow of coke from the heater into the stripper through conduit 19 is typically sufficient to maintain the desired hot coke recycle flow rate into the stripping zone, cap 56 may be provided over the outlet to maintain the desired flow rate and distribution around the stripper. Although discharge of the recycled hot coke from heater 2 into stripping zone 13 is preferably made on the central axis of the stripper, different off-center locations may be selected if flow patterns at the bottom of the coking zone and in the stripper favor. While hot coke may also be recirculated from the gasifier (if present as in a Flexicoking unit), this will generally not be favored as the gasifier coke is at a lower temperature than heater coke as a result of the fuel gas conversion reactions taking place in the gasifier.

The characteristic annular baffle is located immediately at the top of the stripping zone above the stripper sheds and the outlet for the recycle hot coke from the heater. Annular staging baffles with solids flow downcomers (flux tubes) as described in US 2011/0206563 to promote downward flow of solids and upward flow of gases may also be provided in the coking zone at multiple levels above the present characteristic annular baffle but in one embodiment, the annular baffle immediately at the top of the stripping zone is the only downwardly angled frusto-conical baffle in the reactor. In contrast to the configuration of the baffles shown in US 2011/0206563, however, the present annular baffle used to confine the recycled hot coke to the stripping zone has only a central aperture, i.e. is imperforate apart from the central aperture, so as to direct the coke flow into the stripping zone and inhibit recirculation of recycled hot coke from the stripping zone to the coking zone: flux tubes at the periphery of the baffle are absent. A space is allowed below the baffle and above the stripper sheds in order to create a mixing zone in which the coke from the coking zone becomes well mixed with the recycled hot coke so as the promote, as far as practically feasible, a uniform coke composition (albeit on a gross scale) in the stripping zone. Normally the baffle will located from 0.5 to 1.5 bed diameters (stripping zone bed diameter) and in most cases about one bed diameter above the uppermost stripper shed and below the lowermost feed ring in the reactor.

Computational fluid dynamics (CFD) studies have shown that the annular baffle is capable of making a significant difference to the hot coke distribution. In a typical CFD study, the mass fraction of hot coke fed to the top of the striper and recirculated from the stripper to the coking zone was reduced from values in the range of approximately 4 to 20 percent practically to zero indicating that almost all the hot solids fed to the top of the stripping zone would be confined in the stripping zone and the transition zone below the annular baffle. A higher mass fraction of hot coke in the transition zone between the annular baffle and the stripping zone was observed suggesting that a higher temperature zone exists in the transition zone below the annular baffle, which could be helpful to mitigate fouling in the stripping zone. With the annular baffle and the hot coke fed to the top of the stripper, the operating temperatures at the coking zone and the stripping zone can then be controlled separately by adjusting the coke circulation rates to the coking zone and the stripping zone so that the coking zone and the stripping zone are effectively decoupled. This allows the coking zone to be run at a lower temperature, which can increase either the liquid yield or the capacity of the coking process. In general terms, significantly less than 20 percent by weight of the mass flow of hot coke entering the stripper below the baffle will re-enter the coking zone and typically less than 10 or even less, e.g. 2 or 1 percent by weight.

Figure 3:
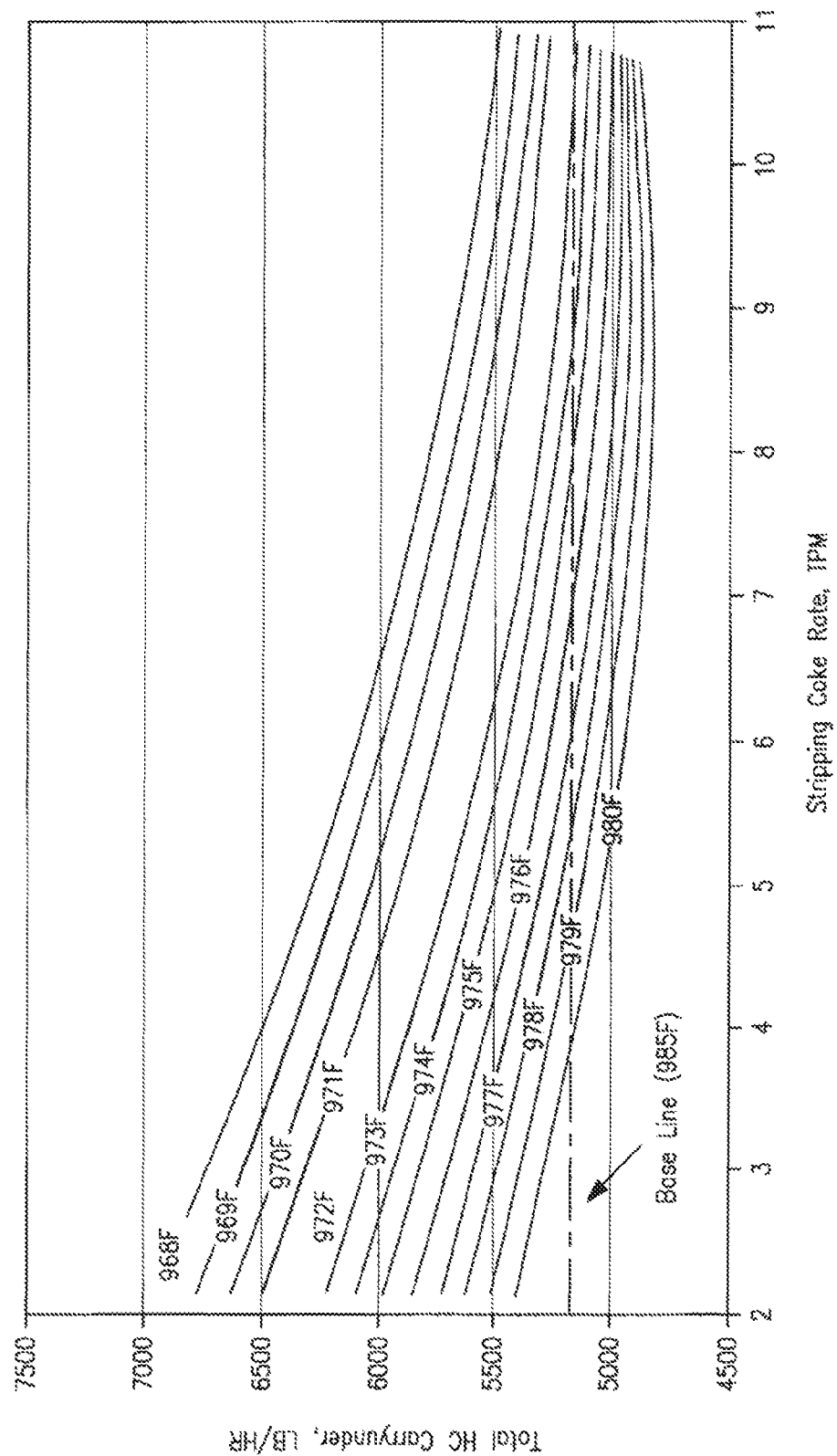
FIG. 3 is a graphical representation showing the effect of stripping coke rate and reactor temperature reduction.

FIG. 3 illustrates the results of a predictive model showing the effect of stripping hot coke rate on hydrocarbon carryunder from the stripper (hydrocarbon transferred from the stripper to the heater) at varying reactor temperatures. The model is based on the use of plain (non-perforated) sheds. The larger the amount of the hydrocarbon carryunder from the stripper, the higher the potential of the fouling problem in the downstream equipment as well as the loss of potential liquid yield by combustion in the heater. The temperature shown in different lines is the reactor operating temperature (° F.). The base line is 985° F. reactor operating temperature without hot coke circulation to the stripping zone. By adding the stripping hot coke to the stripper under the annular baffle to increase the stripper severity, the reactor operating temperature can be reduced while maintaining the same hydrocarbon carryunder from the stripper as the base case. As shown in FIG. 3, for a stripper with parallel plain sheds, the reactor temperature could be reduced by approximately 12° F./7° C. by adding 10.5 TPM (tons per minute) stripping hot coke to the stripper while keeping the same hydrocarbon carryunder as the base case. For a stripper with cross-hatched sheds with lips and apertures as shown in US 2011/0114468, the reactor temperature could be reduced by 17° F./9° C. by adding 10.5 TPM stripping hot coke to the stripper while keeping the same hydrocarbon carryunder as the base case. Temperature differentials of 5 to 15° C. between the coking zone and the stripping zone are therefore realistic given the normal coke recycle rate to the stripper and favorable flow patterns at the top of the stripper induced the downward flow of coke from the coking zone and the entry of the recycle coke.

The invention claimed is:

1. A fluid coking unit for converting a heavy oil feed to lower boiling products by thermal cracking in a fluid bed, comprises:
   (i) a reactor having a coking zone to contain a fluidized bed of solid particles into which the heavy oil feed is introduced;
   (ii) a scrubbing zone located above the coking zone into which vapor phase product from the coking zone is passed;
   (iii) a stripping zone, located at the bottom of the coking zone, for stripping at least a portion of the hydrocarbons which adhere to the solid particles passing into the stripping zone from the coking zone;
   (iv) a heater communicating with the stripping zone to receive solid particles from the bottom of the stripping zone;
   (v) a conduit for passing hot solid particles from the heater to the coking zone;
   (vi) a recirculation conduit for recycling hot solid particles from the heater to the stripping zone; with
   (vii) a centrally-apertured annular baffle at the top of the stripping zone to inhibit recirculation of solid particles from the stripping zone to the coking zone, wherein the centrally-apertured annular baffle is imperforate apart from the central aperture;
   wherein the recirculation conduit has an outlet at the top of the stripper zone below the centrally apertured annular baffle and above a plurality of stripper sheds.

2. A fluid coking unit according to claim 1 which comprises a gasifier connected by a transfer conduit to the heater to receive a portion of the fluidized solid particles from the heater.

3. A fluid coking unit according to claim 2 in which the gasifier is connected by a return conduit to the heater to return fluidized solid particles from the gasifier to the heater.

4. A fluid coking unit according to claim 1 in which the centrally apertured annular baffle and is located above the top of the stripper sheds by a vertical distance to define a mixing zone in which the recirculated hot particles from the heater becomes mixed with the solid particles passing into the stripping zone from the coking zone.

5. A fluid coking unit according to claim 4 in which the centrally apertured annular baffle is located above the top of the stripper sheds by a vertical distance from 0.5 to 1.5 times a bed diameter of the stripping zone.

6. A fluid coking unit according to claim 5 in which the centrally apertured annular baffle is located above the top of the stripper sheds by a vertical distance of about one bed diameter of the stripping zone.

7. A fluid coking unit according to claim 1 in which the centrally-apertured annular baffle comprises a downwardly directed frusto-conical baffle fixed at its outer circumference to the inner wall of the reactor.

8. A fluid coking unit according to claim 1 in which the aperture of the centrally-apertured annular baffle has an open area from 30 to 70% of its total area on a horizontal projection.

9. A fluid coking unit according to claim 1 in which the aperture of the centrally-apertured annular baffle has an open area from 40 to 60% of its total area on a horizontal projection.

10. A fluid coking unit according to claim 1 in which the angle of the centrally-apertured annular baffle is from 30 to 60° from the vertical.

11. A fluid coking unit according to claim 1 in which the centrally-apertured annular baffle has an upturned lip around the circumference of the aperture.

12. A fluid coking unit according to claim 1 in which the recirculation conduit for recycling hot solid particles from the heater to the stripping zone terminates in an outlet at the top of the stripping zone.

13. A fluid coking unit according to claim 12 in which the stripping zone has stripping sheds with the recirculation conduit for recycling hot solid particles from the heater to the stripping zone terminating in an outlet at the top of the stripping zone above the stripping sheds and below the centrally-apertured annular baffle.

14. A fluid coking unit according to claim 12 in which the stripping zone has stripping sheds with the recirculation conduit for recycling hot solid particles from the heater to the stripping zone entering a side of the stripping zone and terminating in a vertical outlet at the top of the stripping zone above the stripping sheds and below the centrally-apertured annular baffle.

15. A fluid coking unit according to claim 1 which includes a gasifier with a conduit connecting the bottom of the stripping zone to the heater to pass solid particles from the stripper to the heater, a conduit for passing hot solid particles from the heater to the coking zone, a conduit for passing hot solid particles from the heater to the gasifier, and a conduit for passing gas from the gasifier to the heater.

* * * * *